United States Patent
Smith

[11] 3,792,414
[45] Feb. 12, 1974

[54] POWER CORD HATCH

[75] Inventor: Gregory A. Smith, North Webster, Ind.

[73] Assignee: Lyall Electric, Inc., Albion, Ind.

[22] Filed: Mar. 15, 1972

[21] Appl. No.: 234,848

[52] U.S. Cl. .................... 339/36, 339/39, 339/75 P
[51] Int. Cl. ........................................... H01r 13/62
[58] Field of Search . 339/36, 37, 39, 43, 44, 75–79, 339/82; 174/67; 191/12, 12.4

[56] References Cited
UNITED STATES PATENTS

| | | | |
|---|---|---|---|
| 2,955,272 | 10/1960 | Gallardo | 339/37 |
| 3,344,393 | 9/1967 | Hendee | 339/75 P |
| 3,613,044 | 10/1971 | Rarick | 339/44 R |
| 3,293,588 | 12/1966 | Blonder | 339/37 |
| 2,643,787 | 6/1953 | Rockman | 339/37 |
| 3,239,791 | 3/1966 | Fyrk | 339/44 M |
| 3,363,216 | 1/1968 | Benedetto | 339/39 |

FOREIGN PATENTS OR APPLICATIONS

| | | | |
|---|---|---|---|
| 713,597 | 7/1966 | Italy | 339/39 |

*Primary Examiner*—Joseph H. McGlynn
*Attorney, Agent, or Firm*—Albert L. Jeffers; Roger M. Rickert

[57] ABSTRACT

An improved hatch for a power supply cord to be used on travel trailers and similar structures wherein it is desired to store within the structure a power supply cord and within the hatch the power supply cord plug and, from time to time, extract that cord and connect it to a source of electrical current is disclosed. The hatch may be fabricated as one piece from polypropylene or other resilient material, there being an integral hinge which pliably couples the hatch housing and cover, and there may be a second integral hinge which pliably couples a flap to the cover or to the hatch housing to selectively open and close a notch in the cover through which the power cord may pass. Means for allowing one way passage of the plug through the back of the hatch during assembly and subsequently preventing its removal during use is also disclosed.

8 Claims, 9 Drawing Figures

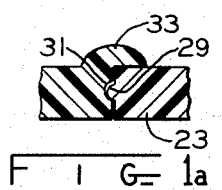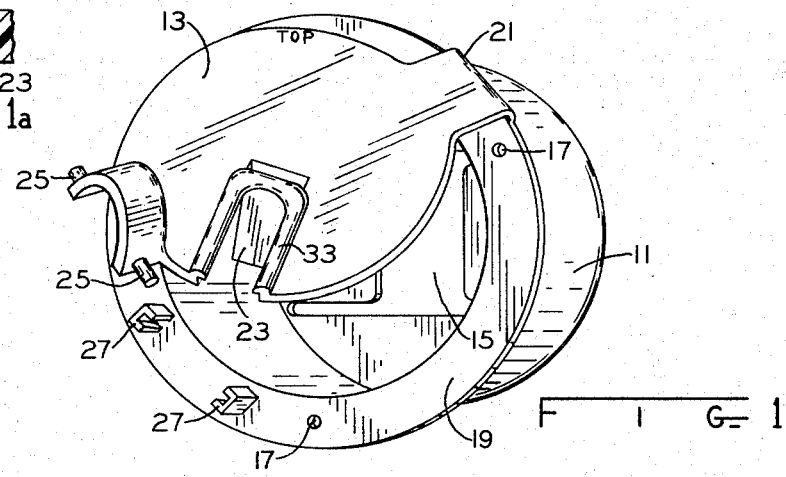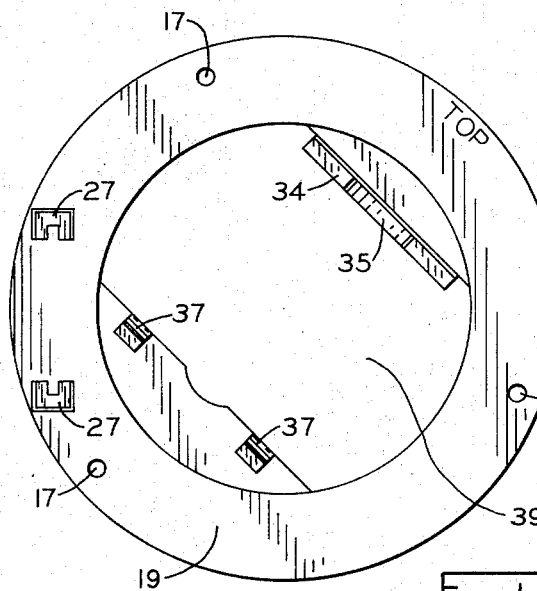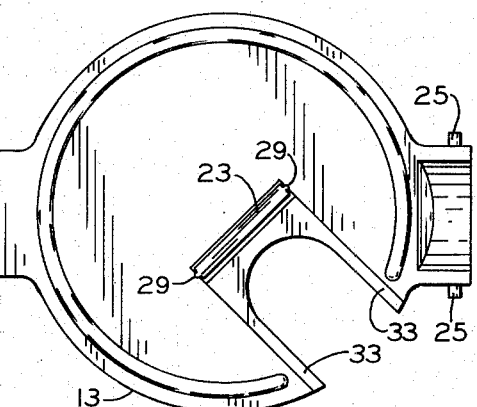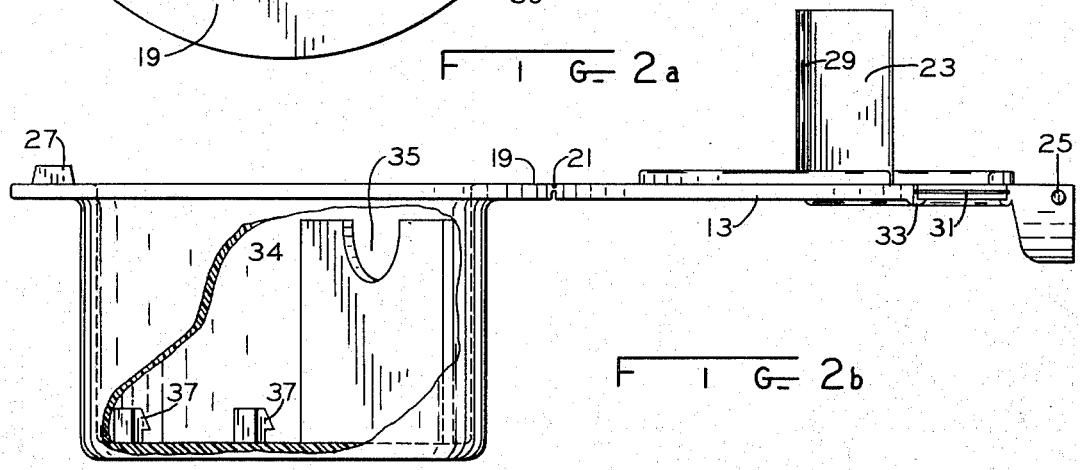

PATENTED FEB 12 1974 3,792,414
SHEET 2 OF 3
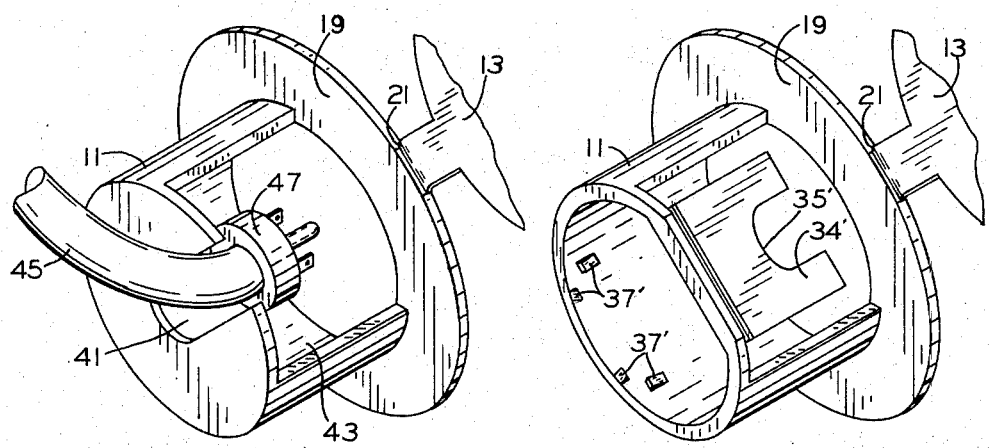
FIG. 3          FIG. 4
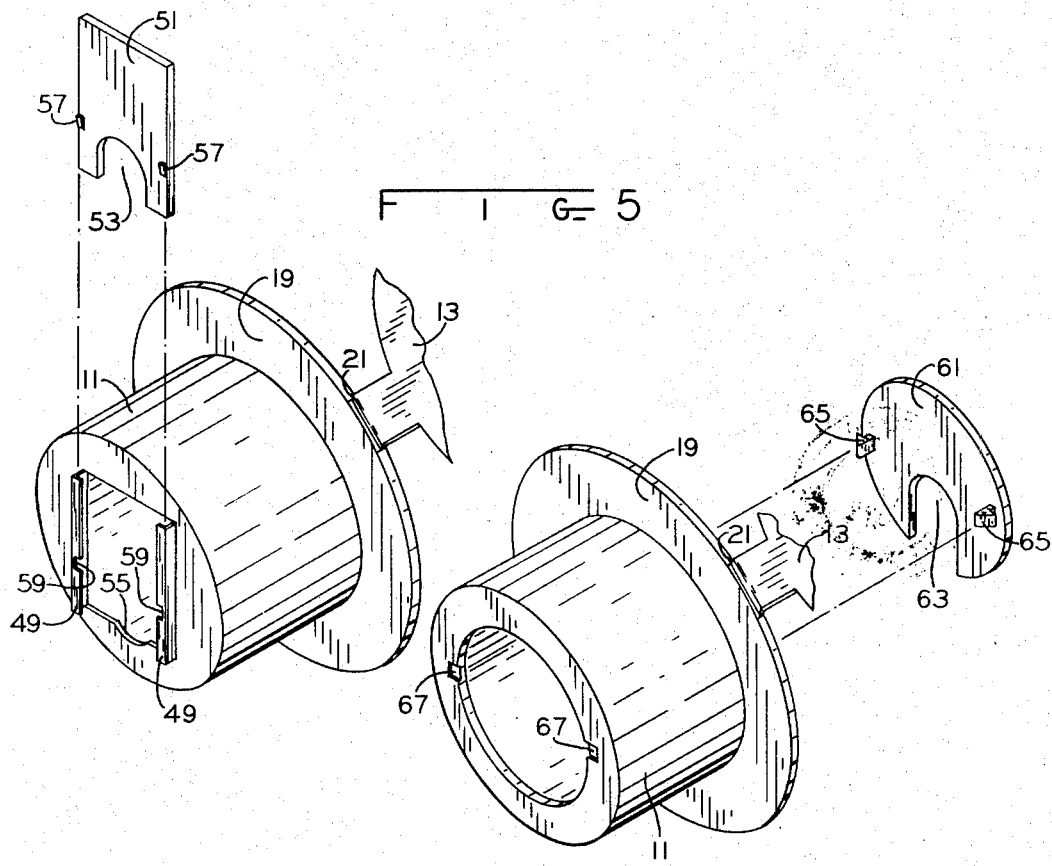
FIG. 5
FIG. 6

PATENTED FEB 12 1974
3,792,414
SHEET 3 OF 3

POWER CORD HATCH

BACKGROUND OF THE INVENTION

This invention relates to a hatch for passing a power supply cord from a travel trailer or similar structure which is suitable to store the power supply plug when the travel trailer is in transit and which is relatively moisture and vermin proof during both storage and use of the power supply cord. Such hatches have been used on travel trailers and the like, the earliest ones being fabricated of metals and being subject to rust and corrosion and being made of a multiplicity of parts requiring assembly operations at the hatch manufacturing location as well as at the installation location. The disadvantages of these early day hatches is more completely discussed in U.S. Pat. No. 3,613,044. The invention of this patent solved many of the prior art problems by providing a hatch molded of nylon of similar material and having a deformable rear opening through which the plug could be forced during assembly and which would not allow the plug to be inadvertently discharged during use.

The hatch of the aforementioned patent was manufactured and sold in two different versions for use in conjunction with so called 15 and 30 amp. plugs, the difference between the two versions being only the size of the rear deformable aperture which had to be varied depending upon which plug was to be used in conjunction with the hatch. This size variation was accomplished in one mold by providing removable inserts which served to vary the dimensions of the deformable rear opening.

Following the introduction of the invention disclosed in the aforementioned patent, a number of similar structures were introduced on the market, and all of these similar structures has a number of separate parts requiring costly and time consuming assembly operations. The prior art has also recognized the desirability of providing a notch in the hatch cover of the appropriate size to accommodate the cable when in use so that the hatch structure is vermin proof during use and providing means for closing off this cable passing notch during times of storage of the plug within the hatch so that the hatch is at all times vermin proof. This vermin proofing feature, however, required additional separate parts and entailed further assembly problems and expenses.

SUMMARY OF THE INVENTION

The above noted prior art defects are overcome in the present invention by providing a relatively simple one piece hatch fabricated of a pliable polypropylene or other resilient material whereby integral hinges between the hatch housing and cover as well as between the cover or the hatch housing and a flap for closing the cable passing notch may be provided thus eliminating all hatch assembly steps. A unique method of molding such a one piece hatch is also disclosed.

Accordingly, it is one object of the present invention to provide a power cord hatch requiring little or no assembly operations.

It is another object of the present invention to provide a power supply cord hatch characterized by the simplicity of plug and cord installation.

It is a further object of the present invention to provide an economical power supply cord hatch.

It is a still further object of the present invention to provide a power supply cord hatch characterized by its unique one way plug passing rear opening.

Yet another object of the present invention is to provide a unique method of fabricating a power cord hatch.

BRIEF DESCRIPTION OF THE DRAWING

These and other objects and advantages of the present invention will appear more clearly to those of ordinary skill in the art from the following detailed disclosure read in conjunction with the accompanying drawings in which:

FIG. 1 is a perspective view of one embodiment of the present invention;

FIGS. 2a and 2b are front and side views respectively of the one piece hatch showing the relative positions of the several elements as they are formed in the mold and illustrating an alternate scheme for preventing loss of the plug through the rear opening of the hatch;

FIG. 3 illustrates a further alternate for the hatch rear opening;

FIG. 4 illustrates a still further alternate for the hatch rear opening;

FIG. 5 illustrates yet another alternate for the hatch rear opening employing a separate piece;

FIG. 6 illustrates a two piece alternate for the hatch rear opening;

DETAILED DESCRIPTION OF THE PREFERRED EMBODIMENT

Figure 7:
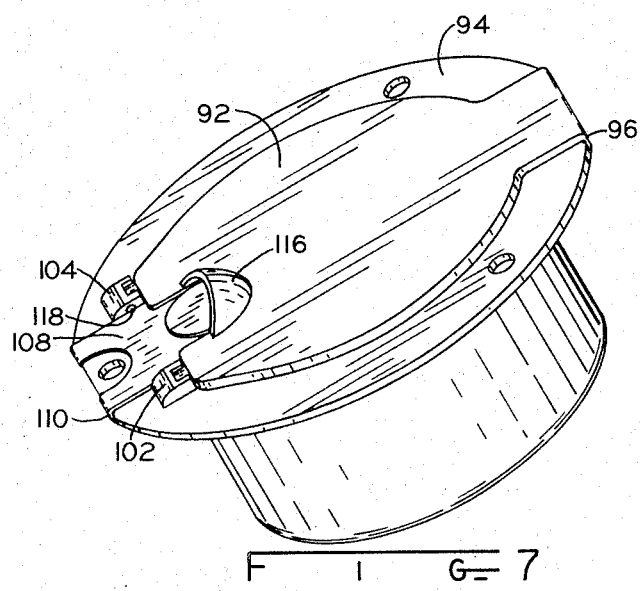
FIG. 7 is a perspective view of an embodiment of the invention alternative to that shown in FIG. 1.

Considering first FIG. 1 which shows a perspective view of one form of the power supply cord hatch, or more simply power cord hatch, of the present invention, several features of the present invention are seen to be common to the aforementioned patent. Like the aforementioned patent the hatch in general has a hollow housing or recess defining portion 11 and a cover portion 13. The recess defining portion or housing 11 has a secondary or rear opening 15 which is adapted to deformably pass an electric plug and to pass a multiconductor cable or power cord without substantial deformation. The hatch is to be mounted in a wall using the mounting holes 17 which are disposed about a mounting flange 19. The cover portion 13 is hinged to the flange 19 of the housing 11, but in a manner entirely different from that disclosed in the aforementioned patent.

A pliable or resilient hinge forming strip common to the cover and the housing interconnects a portion of the periphery of the flange 19 of the housing with a portion of the periphery of the cover portion 13. This pliable hinge 21 may be seen in greater detail in FIG. 2b which illustrates that the hinge is simply a thin line of connecting material between the cover 13 and the periphery of the mounting flange 19. At several points throughout the specification this type of integral hinge will be referred to both as a hinge for the cover 13 as well as hinges for several flaps employed in the present invention.

The hatch of FIG. 1 differs in several further respects from that disclosed in the aforementioned patent. It should be noted that the hinge 21 does not appear as illustrated as being at the top of the hatch, and this is an intentional safety feature. If, for example, the hatch is employed in a travel trailer, and its user fails to close the hatch prior to moving the travel trailer, brush limbs and other obstacles imagined as moving from right to left across the front surface of the hatch as viewed in FIG. 1 will merely brush the cover portion 13 toward its closed position, whereas if the hatch is mounted in the travel trailer wall so that the hinge is directly upwardly, such brush will tend to tear the cover portion off of the hatch. The cover portion 13 will not by itself entirely close the primary or front opening of the hatch, because it has a cord feed port or notch which allows the cover to be closed while the power cord is in use with that power cord passing through the port. When moving or storing the travel trailer the cord, of course, is forced back through the secondary opening 15 so that the plug comes to rest within the hatch housing and the cover is closed, however, prior to closing and latching the cover 13, the flap 23 should be pulled forward and snapped into position so as to make the hatch vermin proof during periods of storage. This flap 23 is again better illustrated in FIG. 2b and is integral with and hinged to the cover 13 using an integral hinge much like the hinge 21. The cover 13 is, of course, held in its closed position when the protruding portion 25 is snapped in place or encompassed by the enclasping means 27.

The embodiment illustrated in FIGS. 2a and 2b is substantially identical to the embodiment illustrated in FIG. 1 except that it, like most of the subsequent embodiments to be discussed, allows the power cord plug to be inserted into the housing through the rear opening without deforming that rear opening and yet still impedes the removal of the plug through that opening. FIGS. 2a and 2b not only illustrate more clearly some of the features of the embodiment of FIG. 1, these drawings also illustrate the manner in which a mold for forming the one piece power supply cord hatch would be constructed since each of the portions of the hatch are shown in the orientation in which they would be molded.

Figure 8:
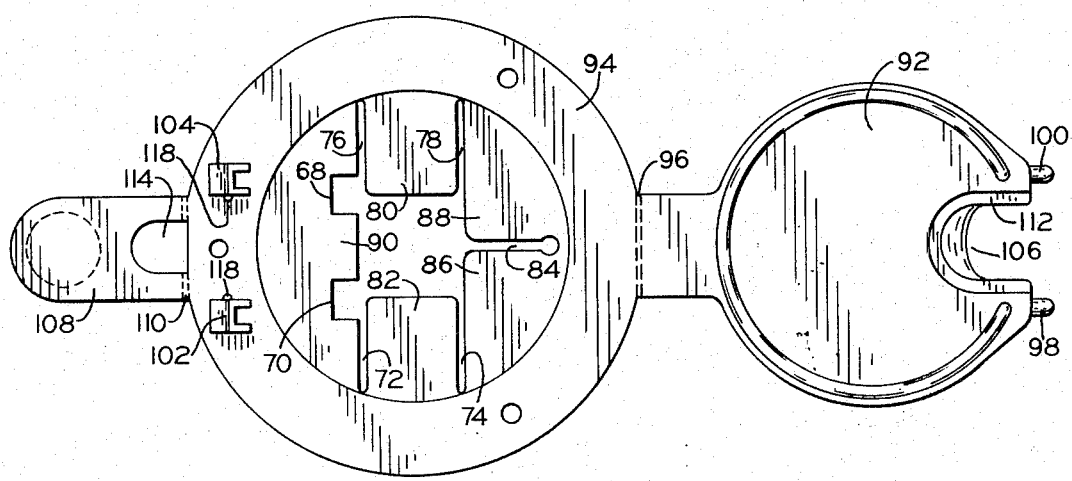
FIG. 8 is a front view of the embodiment of FIG. 7 showing the cover and flap in their originally molded orientation.

Features common to all of the embodiments of the present invention except that of FIGS. 7 and 8 include the integral cord feed port cover or flap 23 which, as illustrated in FIG. 2a, has a pair of sidewardly extending protrusions 29 which, when the flap is closed, mate with a corresponding cutaway portion in the cover which is illustrated in FIG. 1a as 31. A rim 33 is also provided to prevent the flap from being pushed outwardly beyond the level of the cover. It should be noted that flap 23 lies in a plane substantially perpendicular to the plane of the cover portion 13 so as to allow the ready removal of the one piece power cord hatch from its molding form.

A flap 34 integrally hinged to the back interior of the hollow housing in a manner similar to the hinging of the flap 23 may be used in place of the deformable rear opening of the embodiment of FIG. 1. This flap 34 has a cutaway portion 35 for accommodating the power cord, and a pair of clasp means 37 cooperate with this flap to prevent the inadvertent removal of the power cord plug once the hatch and power cord have been assembled. Thus in installing the hatch of FIGS. 2a and 2b a power cord with its attached plug is passed through the rear opening 39, and then the flap 34 is hinged downwardly as viewed in FIG. 2b until its edges snap under the clasp means 37 to thus securely hold the flap in position with the power cord passing through the cutaway notch 35. This flap 34 thus creates during assembly a one way door arrangement which allows the power cord plug to be once passed through the rear opening and then prevented from passing out of the hatch through that same rear opening. It should be noted that the plane of the flap 34 again is substantially perpendicular to the plane of the cover portion 13 (an extension of the plane of the flange 19) so that the entire integral unit may be readily removed from its mold.

As an alternate to hinging this flap 34 to the inside rear portion of the hollow housing 11 the embodiment of FIG. 4 may be employed. Considering now FIG. 4, an analogous flap 34' is initially molded as what might be thought of as an extension of the side walls of the housing 11. This flap 34' again has a notch 35' for accommodating the power cable and again is molded as an integral part of the entire hatch. Analogous clasp means 37' are provided so that once the power cord is passing through the hatch the flap 34' may be bent toward the rear end through substantially 90° so that its remote edges are enclasped between the pairs of raised surfaces 37' on the interior wall of the hollow housing.

In some installations this same effect may be achieved while at the same time achieving slightly greater economy due to the use of less material. The embodiment of FIG. 3 achieves this result by providing a small rear opening 41 which communicates with an additional opening 43 in the side wall of the hatch. To assemble this embodiment the power cord or multiconductor cable 45 with its attached power cord plug 47 is inserted into the hatch by allowing the power cord plug to drop through the additional opening 43 in the side wall while the cable slides into the relatively narrow slot 41 in the rear end of the hatch. After this is accomplished the hatch is mounted in a wall in the normal fashion and that wall itself prevents the inadvertent removal of the plug. Thus the embodiment of FIG. 3 differs from all of the other embodiments of the present invention in that the power cord plug must necessarily be inserted into the hatch prior to the mounting of the hatch in its intended environment. All of the other embodiments may be assembled in either order and, of course, use of the FIG. 3 embodiment is limited to situations where the mounting wall is sufficiently thick to prevent the inadvertent removal of the plug from the hatch through the side wall opening 43.

Two further embodiments are illustrated in FIGS. 5 and 6 which, while they do require two pieces for their construction thus increasing cost, do provide an additional rear opening vermin proofing feature. Thus the hatch cover 13 may inadvertently be left open, and yet a mouse or other vermin cannot enter the travel trailer because there is no accessible second opening in the rear of the hatch. Considering first the FIG. 5 embodiment, a slide track means 49 is provided on the exterior rear wall of the hatch, and a separate piece 51 having a cutaway portion 53 is provided which will slide in the tracks 49. Like the embodiment of FIGS. 2a and 2b, the rear wall of the hatch of FIG. 5 may also be provided with a mating cutaway notch 55 so that the entire structure when closed on the power cord more nearly fits around the cord for vermin proofing or other purposes. The separate piece 51 is provided with a pair of protuberances 57 which when the separate piece is properly aligned and grasping the power cord mate with notches 59 in the tracks to prevent the separate piece 51 from being dislodged. As an alternative separate piece embodiment, FIG. 6 illustrates a disc 61 having a cutaway portion 63 for accommodating the power cord and having a pair of hook like protrusions 65 which, when the disc 61 is inserted into the hatch from the front opening, eventually mate with a pair of notches 67 in the rear wall of the hatch to again prevent the disc 61 from being inadvertently dislodged.

The hatch of FIG. 7 and 8 illustrate the present invention in yet another and preferred form. As noted earlier the hatch of the aforementioned patent was marketed in two versions having two different size deformable rear openings in order to accommodate both 15 to 30 amp. plugs. The hatch of the preferred embodiment as illustrated in FIG. 8 provides an improved deformable rear opening which will accommodate both 15 and 30 amp. plugs. It should also be noted that the mold for forming the hatch of FIGS. 1 or 2 would be relatively expensive and difficult to make due primarily to the need to provide a mold portion for forming the flap 23. This flap 23 might also cause difficulties when extracting the hatch from the mold.

In order to provide a deformable rear opening which will pass different size plugs, a pair of notches 68 and 70 are provided to accept the connector blades of a male 30 amp. plug so as to effectively position that plug somewhat lower than the position required for inserting the 15 amp. plug. It should be recalled that the plug terminals are passed through the back of the rear opening, and then the plug rotated upwardly through 90° during the insertion process. The remaining portion of the rear aperture illustrated in FIG. 8 is much like that shown in the aforementioned patent and is of a generally rectangular configuration which is extended by slits 72, 74, 76 and 78 which are parallel to two opposite sides of the rectangle so as to form two flaps 80 and 82, which are deformed during the plug insertion process. Yet another slit 84 is provided in a direction perpendicular to the aforementioned opposite sides of the rectangle to form two further flaps 86 and 88. During the insertion process flaps 80, 82, 86 and 88 are deformed while the flap 90 is not substantially deformed since it forms the fulcrum about which the plug is rotated during the insertion process.

The cover 92 is, like the cover 13 of FIG. 1, integral with the periphery of the mounting flange 94 so as to form a pliable hinge 96 between the housing and the cover, however, this cover 92 snaps shut by the interaction of a pair of protrusions 98 and 100 and a pair of enclasping means 102 and 104. The space between the protrusions 98 and 100 is left open to form a cord feed port 106 through which the power cord may pass when the cover 92 is closed on the hatch. The cord feed port flap 108 is formed integral with the flange 94 at a point on the periphery of this flange diametrically opposite the region forming the hinge 96 to form another pliable hinge 110. Thus in contradistinction to the embodiment of FIG. 1, both the flap 108 and the cover 92 are hingeably integral with the mounting flange 94. This eliminates the aforementioned problem of molding the flap 23 perpendicular to the cover 13, and thus a more simple easily fabricated mold may be employed to manufacture the hatch of FIGS. 7 and 8. The flap 108 is about one half the thickness of the cover 92, and the cover is provided with an undercut arcuate portion 112 so that the flap 108 may be folded shut as shown in FIG. 7 and then the cover 92 folded shut so that the protrusions 98 and 100 are enclasped in the respective enclasping means 102 and 104 to securely hold both the flap 108 and the cover 92 in their closed position. The flap 108 may be cutaway at 114 so as to not interfere with mounting screws passing through the flange mounting holes, and the cover 92 may be provided with a pull forming portion 116 under which the user may place a finger in order to open the hatch cover. A pair of inwardly extending bosses 118 serve to hold the flap 108 in its closed position both to make the hatch easier to close and to remove some of the opening forces between the enclasping portions 102 and 104 and the protrusions 98 and 100 when the hatch is in its closed position. These forces occur because the polypropylene of which the hatch is fabricated has a tendency to return to its original molded configuration, which in this instance is the position with both flap 108 and cover 92 in their open position.

In all other respects the hatch of the present invention is identical to the one disclosed in the aforementioned U.S. Pat. No. 3,613,044, the disclosure of which is incorporated herein by reference.

Thus while the present invention has been described with respect to specific embodiments, numerous modifications will suggest themselves to one or ordinary skill in the art having the present disclosure before him, and the scope of the present invention is to be measured only by that of the appended claims.

I claim:

1. A power cord hatch having spaced apart front and rear openings therein, said front and rear openings adapted to pass a power supply cord and a plug attached thereto and said hatch adapted to stow the plug during periods of nonuse, means for partially closing said rear opening whereby the cord may still pass freely therethrough however passage of the plug is prevented, said means for partially closing comprising a separate piece provided with a cord accepting notch and insertable into position for partially closing said rear opening through said front opening, a cover portion means independent of said means for partially closing said rear opening for closing at least part of said front opening to prevent passage of said plug through the front opening, and hinge means interconnecting a portion of the periphery of said cover portion to a portion of the hatch in the vicinity of the front opening.

2. The power cord hatch of claim 1 wherein the separate piece for partially closing comprises means on at least a part of the periphery thereof for mating with corresponding portions of the periphery of the rear opening to prevent the separate piece from being inadvertently dislodged from its rear opening closing position.

3. The power cord hatch of claim 1 wherein the cover portion is provided with a cord feed port, the hatch further including means for closing the cord feed port when the plug is within the housing.

4. The power cord hatch of claim 1 wherein the hinge means comprises a pliable strip of connecting material common to the cover portion and a portion of the hatch in the vicinity of the front opening.

5. A power cord hatch to be used in conjunction with a multiconductor cable having a plug attached thereto and comprising:

a plug recess defining portion having first and second opposite ends respectively having first and second openings therein;

a mounting flange attached to said recess defining portion near the first end thereof;

a cover portion adapted to close at least part of said first opening to prevent passage of said plug through said first opening; and means for partially closing said second opening comprising a separate piece provided with a cable accepting notch and insertable into position for partially closing said second opening through said first opening whereby the cable may still pass therethrough however passage of the plug is prevented.

6. The power cord hatch of claim 5 wherein said cover portion is provided with a cutaway portion for accommodating the cable and further comprising a flap for closing the cutaway portion, and a strip of connecting material common to said cover portion and said flap and adapted to allow the rotation of said flap about the hinge means relative to said cover portion.

7. The power cord hatch of claim 5 wherein the cover portion is provided with a cord feed port, the hatch further including means for closing the cord feed port when the plug is within the housing.

8. A power cord hatch to be used in conjunction with a multiconductor cable having a plug attached thereto and comprising:

a generally cylindrical plug recess defining portion having first and second opposite ends respectively having first and second openings in the said opposite ends:

a mounting flange attached to said recess defining portion near the first end thereof;

a cover portion adapted to close at least part of said first opening to prevent passage of said plug through said first opening;

hinge means interconnecting said cover portion and said flange;

and means for partially closing said second opening whereby the cable may still pass freely therethrough however passage of the plug is prevented, said means for partially closing including a separate piece provided with a cable accepting notch and insertable into position for partially closing said second opening through said first opening.

* * * * *